April 29, 1969 H. E. COTTER ET AL 3,441,224
CENTER-FEED SPREADER
Filed April 13, 1967

INVENTORS:
HOWARD E. COTTER
JAY E. BARTH
BY: Dawson, Tilton,
Fallon, Lungmus &
Alexander, ATT'YS

INVENTORS:
HOWARD E. COTTER
JAY E. BARTH

INVENTORS:
HOWARD E. COTTER
JAY E. BARTH

United States Patent Office 3,441,224
Patented Apr. 29, 1969

3,441,224
CENTER-FEED SPREADER
Howard E. Cotter and Jay E. Barth, both of R.R. 1,
Flanagan, Ill. 61740
Filed Apr. 13, 1967, Ser. No. 630,720
Int. Cl. A01c 17/00, 19/00; E01c 19/20
U.S. Cl. 239—656                                      9 Claims

ABSTRACT OF THE DISCLOSURE

A wide-path spreader for fertilizer or other granular material including a compartmentalized, funnel-shaped hopper mounted on a four-wheel carriage adapted to be pulled by a tractor. A blender unit is mounted on a grain slide which is received beneath the mouth of the hopper such that the entire unit may be used either as a grain wagon or as a spreader. The blender is provided with separate discharge throats, each communicating with a hopper conpartment; and slide valves are provided for independently setting the flow rate through the discharge throats. Spring-loaded trap doors seal the discharge throats when the trap doors are in a closed position. A hydraulicly-powered fan is rotatably mounted beneath the trap doors. When the trap doors are opened, they extend on either side of a blender bar which cooperates with the open doors to define a distribution flow pattern for the material of substantially constant density for supplying the rotating fan. Transverse baffle plates are located in front of and behind the fan for channeling the material laterally beneath the carriage in distributing it over a forty-foot path.

BACKGROUND

The present invention relates to a power-assisted spreader; more particularly, it relates to a power-assisted spreader of the kind which is intended to be drawn by a tractor and to carry upwards of a thousand pounds of fertilizer or similar granular material.

Most prior designs for speraders of this kind have included a power-assisted spreading device located at the rear end of a truck or trailer, and these structures require a conveyor or auger to transmit the material from beneath the hopper rearward to the spreading section. Such complicated spreaders encounter serious maintenance problems, particularly in view of the corrosive nature of most fertilizer materials when combined with moisture in crevices between bearing surfaces.

Further, some prior spreaders have required complicated baffling structures for directing the grain from a powered rotary disk to achieve an even spread of the material. Such complicated baffling structures have severly limited the area over which the material may be spread thereby requiring more passes in covering the same area as the instant invention.

The prior art also includes spreading devices in which the material is broadcast in front of the unit, but these are designed primarily for small amounts of fertilizer, such as might be used on a lawn; and they are primarily intended to be pushed by the operator from behind the unit. Such devices are clearly not adaptable for use with a tractor, as is the instant invention. Nor are these latter devices suited for carrying large amounts of fertilizer in a manner such that the load is evenly distributed on the supporting wheels of the unit regardless of whether the hopper is full or nearly empty.

SUMMARY

The present invention provides a metering and blending unit mounted on a grain slide adapted to be received beneath the mounth of a funnel-shaped, compartmentalized hopper. The hopper is supported on a carriage having unobstructed lateral portions through which the fertilizer is spread. When the grain slide is placed beneath the mouth of the hopper to seal it, the apparatus may be used as a conventional grain wagon, and the metering unit may be removed from the grain slide for maintenance or storage.

When the metering unit is positioned beneath the mouth of the hopper, a fan and baffle assembly is mounted on the carriage beneath the metering and blending unit for channeling the fertilizer through the lateral openings beneath the carriage.

The metering unit includes separate discharge throats, one communicating with each of the compratments in the hopper for receiving the contents thereof. Slide valves are provided in the discharge throats, and they are independently adjustable for measuring quantities of the material being spread. Trap doors are provided beneath the orifices of the discharge throats, and they may be set in one of two positions. In a closed position, the trap doors seal the orifices of the discharge throats thereby preventing the material from passing through the discharge throats. In an open position, the trap doors swing down and are limited and held in position on either side of a vertical blending bar.

As the fertilizer falls down under force of gravity on its respective trap door, it will accumulate in a space defined on one side by the blender bar and on the other by the trap door. Fertilizer falls down in the elongated opening between the blender bar and trap door to define a constant distribution flow pattern for supplying the rotating fan. As used herein, the distribution flow pattern will refer to feeding the material being spread onto the rotating fan, and the spreading pattern will refer to the overall area over which the material is thrown by the fan.

As the slide valves are adjusted for more fertilizer, the density of the distribution flow pattern will remain constant, but the flow pattern will elongate while maintaining a constant width. If more than one material is being spread, the flow patterns are independent of one another, but in each case the flow pattern will be symmetrical with respect to the center of the rotating fan. This ultimately achieves a better spread pattern.

Hence, the present invention, by separating the functions of metering and defining a flow pattern provides an overall spread pattern which is independent of the feed rates of the materials.

Since the instant invention contemplates a power-assisted rotating disk located beneath the mouth of a funnel-shaped hopper which is mounted on a self-supporting carriage, there is no need for force feeding devices such as conveyers or augers as are found in prior spreaders of the same capacity. This is an important factor toward providing a maintenance-free spreader capable of extended use without interference due to corrosion. Extended contacting surface areas between two adjacent parts is minimized.

Further, the instant invention, by providing that a funnel-shaped hopper be mounted on a self-supporting carriage, achieves an even distribution of the weight of the material being spread on the carriage frame whether the hopper is empty or full. In prior devices having only two wheels, with a full load the entire weight was generally on the draw bar between the spreader and the tractor; and with a relatively empty load, the weight was rearward of the spreader axle.

By providing a compartmentalized hopper which is convertible between a grain wagon and a spreader, the user is able to eliminate the cost of blending materials and the delay time sometimes required in ordering the premixed variety. The present invention is capable of operating at relatively high tractor speeds, and since it is designed to spread over a path width of forty feet, spreading time is significantly reduced.

Other advantages and features of the instant invention will be obvious to persons skilled in the art from the following detailed description accompanied by the attached drawing in which identical reference numerals will refer to like elements in the various views.

THE DRAWING

DETAILED DESCRIPTION

Figure 1:
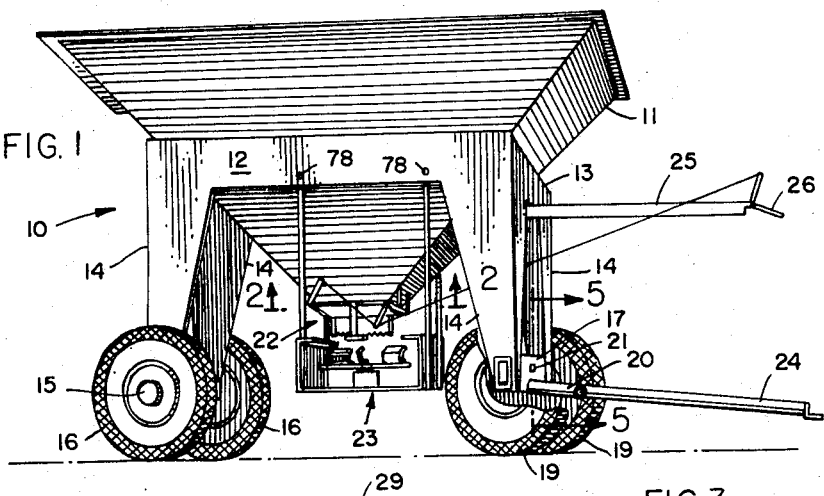
FIG. 1 is a perspective view of a spreader structure according to the instant invention.

Referring then to FIG. 1, the overall wagon or spreader is generally referred to by reference numeral 10; and it includes a funnel-shaped hopper 11 mounted on a frame or carriage 12. As shown, the hopper 11 takes the shape of an inverted pyramid, but its particular shape is not as important as the fact that its contents are uniformly funneled under force of gravity to the lowest part of the hopper.

The carriage 12 includes an upper peripheral supporting frame 13 receiving the hopper 11. Four leg members, identified as 14 depend from the corners of the frame 13. The front of the wagon appears at the right side of FIG. 1. A rear axle 15 is journaled through two of the real legs 14, and two rear wheels 16 are rotatably mounted on the rear axle 15.

As has already been mentioned, in order to eliminate means for force feeding from a position beneath the center of the hopper to either the front or rear of the wagon, a baffle and fan assembly is provided directly beneath the hopper opening for receiving and spreading the grain laterally beneath the wagon. In order to accomplish this, it was necessary to eliminate the reach found in conventional grain wagons. At the same time, all four wheels could not be rigidly connected to the carriage since this would produce undesirable tilting of the hopper and its contents when one of the wheels passed over a bump or mound. The manner in which the present invention overcomes this problem will now be explained. For simplicity, when an element is referred to as having a transverse orientation, it will be assumed unless otherwise specifically stated, that it is transverse to the direction of travel of the spreader.

A rigid transverse forward housing 17 is connected between the forward legs 14 of the carriage 12. A solid forward axle 18 is received within the housing 17. Two forward wheels 19 are coupled to the forward axle 18 for rotation in a horizontal plane, as is well known. Conventional tie rods (not shown) and a pivot bar 20 extending through the lower center portion of the housing 17 are also provided. A pivot rod or pin 21 extends through the center of the forward axle 18 and it is journaled in the housing 17 at its transverse middle but somewhat above its horizontal center. This is to allow the forward axle 18 to rotate within the housing 17 if either of the forward wheels 19 is forced upward. The reason for the eccentric mounting of the forward axle 18 within the housing 17 is to permit the forward axle 18 to bear against the upper part of the housing 17 on the side of a raised wheel thereby lifting the wagon directly. If the lower side of the forward axle 18 were permitted to engage the bottom of the housing 17 before the raised side engaged the upper side of the housing 17, there would be a tendency to tear the lower side of the housing out, whereas with the present arrangement, the tendency is to rotate the forward axle and stabilize the load before the higher side of the axle 18 hits the upper side of the housing 17 to lift the entire wagon directly.

Still referring to FIG. 1, when the wagon is arranged as a spreader, as will be described in more detail below, a metering and blending unit, generally designated by reference numeral 22 is located beneath the mouth in the hopper 11. The two functions of the metering and blending unit are first to set the rate at which material will flow from the compartments of the hopper 11, and, secondly, to provide a distribution flow pattern of constant density independent of the flow rate. Located beneath the metering and blending unit 22 is a fan and baffle unit 23 which receives material flowing through the metering and blending unit 22 in a flow pattern defined thereby and channels this material laterally beneath the wagon in a uniform spread pattern.

A draw bar 24 is coupled to the pivot bar 20 for attaching the wagon behind a conventional tractor. In addition, an upper extension bar 25 is fastened to the front of the frame 13, and it extends forward to a position directly behind the operator's seat of the tractor (not shown). At the forward end of the extension bar 25, a handle 26 is pivotally connected. The handle 26, as will be made clear below, opens and closes the trap doors of the metering and blending unit 22 without requiring the operator to leave his seat.

Figure 2:
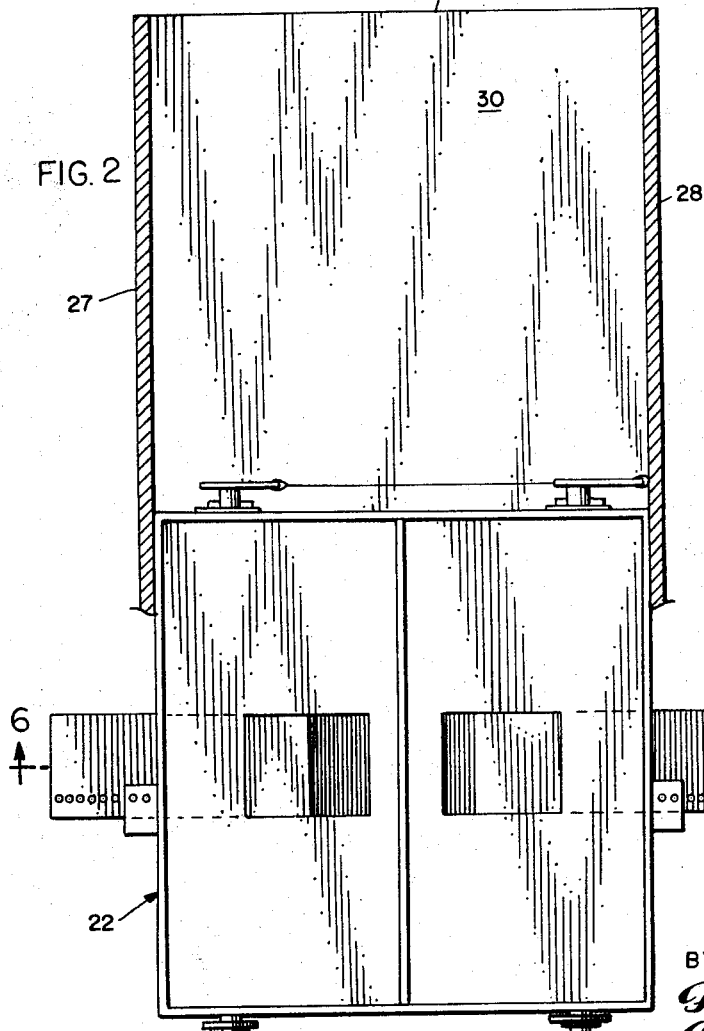
FIG. 2 is a bottom view of the grain slide with attached metering and blending unit as seen in the sight line 2—2 of FIG. 1.
Figure 3:
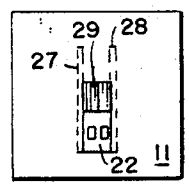
FIG. 3 is a diagrammatic top view of the hopper of the structure of FIG. 1 illustrating its arrangement as a grain wagon.
Figure 4:
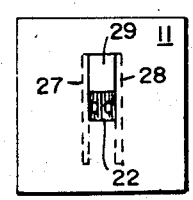
FIG. 4 is a diagrammatic top view of the hopper of the structure of FIG. 1 illustrating its arrangement as a spreader.
Figure 5:
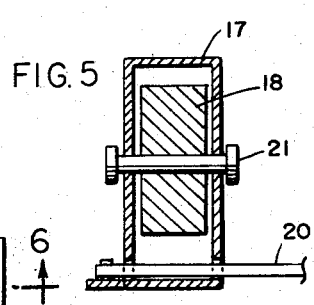
FIG. 5 is a side section view of the forward transverse bar of the carriage seen through the sight line 5—5 in FIG. 1.

Turning now to FIGS. 2-4, the attachment of the metering and blending unit 22 to a grain slide and the convertability of the wagon between a grain wagon and a spreader will now be described in detail. A pair of slides, identified by reference numerals 27 and 28 are mounted beneath the opening in the hopper 11 and they extend transverse of the intended direction of travel of the wagon 10 for receiving a grain slide 29. The grain slide 29 is a rectangular metal sheet having a solid portion 30 adjacent an apertured section on which is removeably mounted the metering and blending unit 22. In the view of FIG. 2, only the metering structure of the unit 22 is shown, but it can be seen that if the unit 22 is detached from the grain slide 29 it may be removed therefrom by simply dropping it away from the grain slide.

FIG. 3 is a diagrammatic illustration of the wagon arranged as a conventional grain wagon with the solid portion of the grain slide 29 sealing the mouth of the hopper 11; and FIG. 4 illustrates the wagon 10 arranged as a spreader with the metering and blending unit 22 located beneath the mouth of the hopper 11. Preferably, means are provided for locking the grain slide 29 in either of the positions shown in FIGS. 3 or 4 so that it does not move during transportation.

METERING AND BLENDING UNIT

Figure 6:
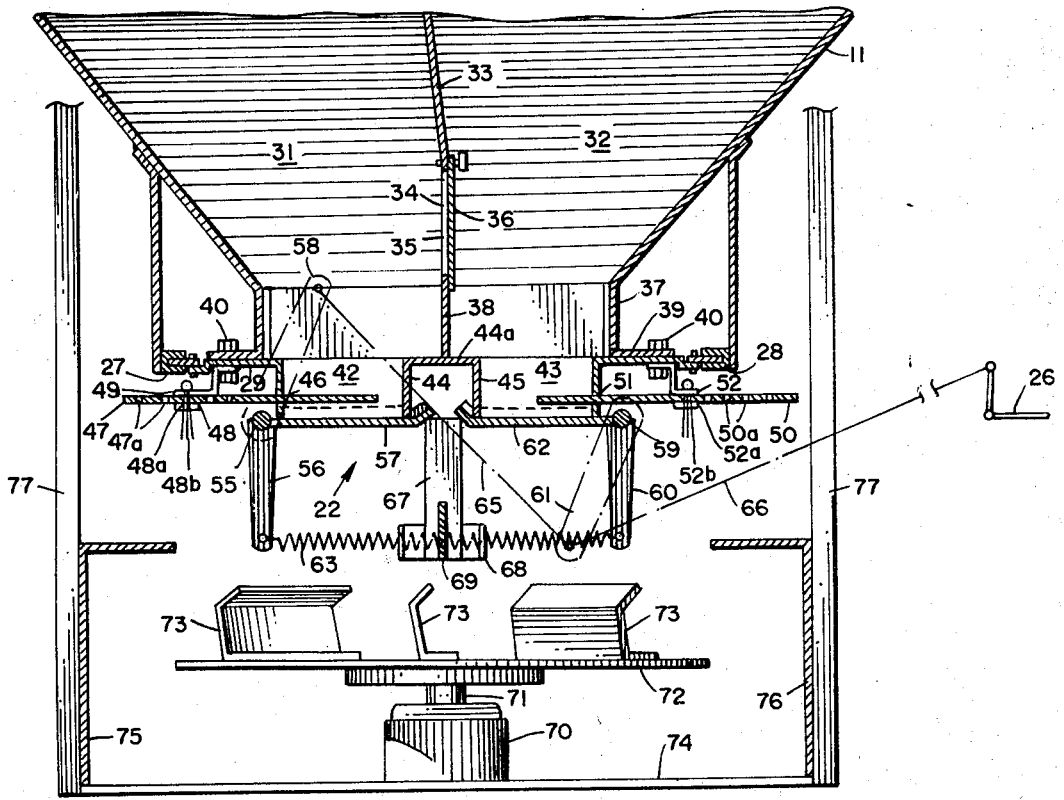
FIG. 6 is a detailed side section view of the metering and blending unit and the fan and baffle assembly of the structure of FIG. 1 with the trap doors in a closed position.
Figure 7:
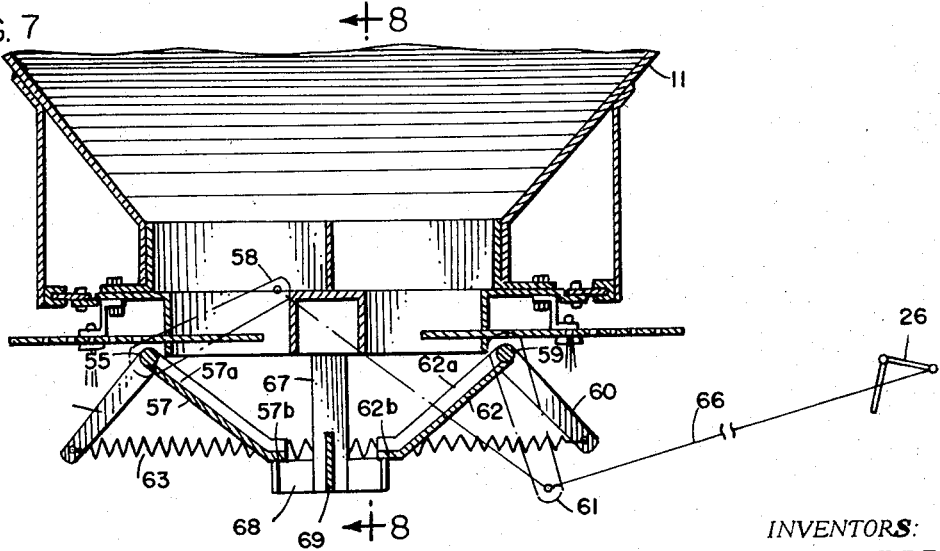
FIG. 7 is a close up side sectional view of the metering and blending unit with the trap doors in an open position.

Turning now to FIGS. 6 and 7, the metering and blending unit 22 will be described in detail. For purposes of illustration, the hopper 11 is divided into two separate compartments, identified respectively as 31 and 32. A center divider 33 separates the compartments 31 and 32. The center divider 33 angles slightly toward the compartment 31 and defines a substantially vertical lower portion 34 which defines a center aperture 35. A door 36, which is mounted to the center divider 33 for rotation in a vertical plane is shown in a position for closing the aperture 35, as will be discussed in more detail below.

The mouth of the hopper 11 defines a rectangular throat member 37 having generally vertical side walls and a transverse center divider 38. A horizontal peripheral flange 39 is welded to the throat 37, and it provides a horizontal border about the throat 37 for receiving bolts 40 which lock the grain slide 29 and its associated metering and blending unit 22 in one of the two previously-described positions. As shown in FIG. 6, the wagon is arranged as a spreader, so that the metering and blending unit 22 is locked beneath the mouth of the hopper 11.

The metering and blending unit 22 includes first and second discharge throats, identified generally by reference numeral 42 and 43 respectively. The discharge throat 42 communicates with the hopper compartment 31, and the discharge throat 43 communicates with the hopper compartment 32. Discharge throat 42 in defined by a vertical side wall 44 having a rectangular cross section and depending from a mounting plate 44a which is secured to the grain slide 29. A similar side wall 45 also depends from plate 44 to define the discharge throat 43.

In the rear side of the side wall 44 defining discharge throat 42 is a rectangular aperture 46 through which is received a slide member 47. Exterior to and rearward of the discharge throat 42, the slide member 47 is received through an ear 48 which is secured to the lower surface of the mounting plate 44a. A similar slide member 50 is fitted through an aperture 51 in the front side of the side wall 45 which defines discharge throat 43. On ear 52 is fastened to the bottom surface of the mounting plate 44 for slidably receiving the slide member 50 and supporting it at a position external to the discharge throat 43.

Each of the slide members 47 and 50 are provided with a series of central apertures 47a and 50a respectively spaced longitudinally thereof. The ears 48 and 50 are provided with similar holes as shown at 48a and 52a. The slide member 47 is adjusted until one of the apertures 47a registers with the holes 48a. A cotter pin 48b is then placed through the registered holes and locks the slide member 47 in place. A cotter pin 52b similarly locks the slide member 50 in place. Thus, two slide valves are provided for adjusting the aperture in their associated discharge throat for metering the flow of fertilizer, or similar granular materials from its associated hopper compartment.

A first transverse bar 55 is suitably journaled in arms depending from the mounting plate 44a. Attached to the far side (as viewed in FIG. 6) of the transverse bar 55 is an arm 56 which extends downwardly. A first trap door 57 is also rigidly mounted on the transverse bar 55, and in the position shown in FIG. 6, the trap door 57 seals the discharge throat 42. On the near side of the transverse bar 55, which extends slightly beyond the metering and blending unit 22, is a second extension arm 58 which extends upwardly and slightly forwardly as shown in phantom in FIG. 6.

A similar arrangement is associated with discharge throat 43, and it includes a second rotatable transverse bar 59 located forward of the discharge throat 43. At the far side of the transverse bar 59 is fixed a depending extension arm 60; and at the near side of the transverse bar 59 is fixed a second extension arm 61 which extends downwardly and slightly toward the rear. A second trap door 62 is rigidly attached to the transverse bar 59 for rotary motion therewith, and the trap door 62 is shown as sealing the discharge throat 43. A coil spring 63 is stretched in tension between the lower ends of the depending extension arms 56 and 60, and the spring 63 normally biases the trap doors 57 and 62 in a closed position such that they seal the discharge throats 42 and 43 as shown in FIG. 6.

A cable, diagrammatically represented by the chain line 65 is fastened between the free ends of the extension arms 58 and 61. A second cable, schematically represented by the chain line 66, is connected between the free end of the extension arm 61 and the L-shaped handle 26. When the handle 26 is rotated to its forward position, the extension arm 61 is rotated counterclockwise with the transverse bar 59 thereby opening trap door 62; and this motion causes a corresponding clockwise motion of the extension arm 58 about the transverse bar 55 to open the trap door 57.

The trap doors 57 and 62 are shown in their open position in FIG. 7; and it will be noted that the extension arms 56 and 60 have been rotated away from one another thereby causing further tension in the spring 63. It will also be noted that the cable 66 has been moved across the horizontal center line of the pivot P about which the handle 26 rotates. The system is therefore in a stable state defining a second discrete position, that is the open position for the trap doors 57 and 62. Vertical bars 67 and 67a (one of which is shown in FIGS. 6 and 7, and identified as 67) are mounted at the sides of the metering and blending unit for supporting U-shaped members, the one shown in FIG. 7 is designated 68, facing one another beneath the metering unit.

Trap doors 57 and 62 have side wall portions 57a and 62a respectively forming a trough for the falling fertilizer; and they further define inclined members 57b and 62b respectively which, in the open position, are horizontally disposed. The downward motion of the trap doors 57 and 62 is limited by action of the inclined members 57b and 62b engaging the inwardly turned lips of the U-shaped stoppers 68.

A blender bar 69 is mounted to the vertical bars 67 and 67a extending the width of the trap doors 57 and 62. As best seen in FIG. 7, the width of blender bar 69 is vertically disposed, and its upper edge extends above the horizontal plane containing the inclined portions 57b and 62b of the trap doors when they are open.

Figure 8:
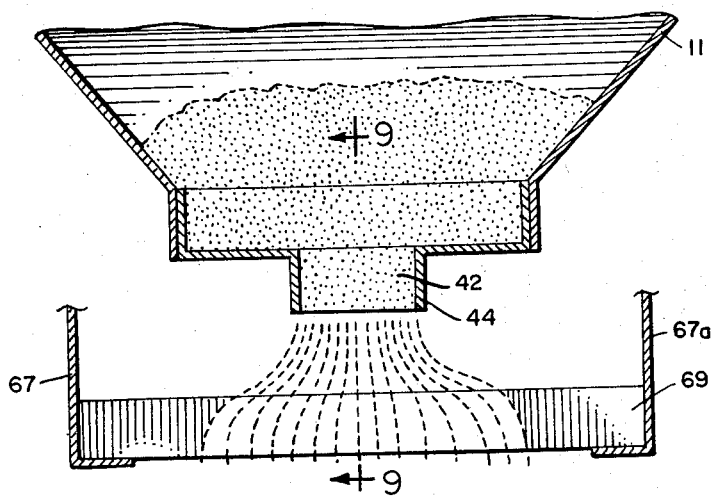
FIG. 8 is a section view taken through the sight line 8—8 in FIG. 7 illustrating a distribution flow pattern.
Figure 9:
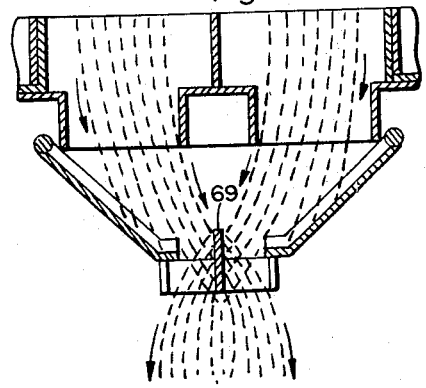
FIG. 9 is a view taken through the sight line 9—9 of FIG. 8.

The function of the blender bar 69 is to cooperate with the trap doors to define the distribution flow pattern of the fertilizer as it falls through a discharge throat and on to a trap door and thence downward to a rotating fan. This action is best illustrated in FIGS. 8 and 9 wherein it can be seen that the falling material will be channeled by its associated trap door toward the blender bar 69 and then downward. It is important to note that the position of the blender bar 69 as it is disposed between the two trap doors when they are in an open position, allows the distribution flow pattern for the two compartments to remain independent. In other words, as seen in FIG. 8, when the slide valve associated with discharge throat 42 is set at a position to allow maximum grain flow, the discharging fertilizer will accumulate between the trap door 57 and the blender bar 69 and, rather than flowing over the blender bar 69, it will distribute itself evenly longitudinally of the blender bar 69 as seen in the drawing. Hence, the distribution flow pattern of the fertilizer as it falls on a rotating fan beneath the metering and blending unit will be of constant density, and of constant width, but its length will vary as a function of the flow rate of the fertilizer. As the length increases, it will do so symmetrically with respect to the center of the rotating fan which receives the fertilizer as will be made clear. This is a particularly important advantage of the instant invention since it enables the spread pattern to remain constant independent of flow rate and, at the same time, it separates the distribution flow patterns of two different materials that are being spread.

FAN AND BAFFLE ASSEMBLY

As seen in FIG. 6, the fan and baffle assembly comprises a conventional hydraulic motor 70 having its shaft 71 coupled to a disk 72 for rotating it. Protruding above the disk 72 are a series of fan blades 73 having a generally cup-shape cross section fastened to the upper surface of the disk 72 and extending radially with respect to it.

The hydraulic motor 70 is mounted on a mounting plate 74 which itself is mounted beneath two transverse baffle plates 75 and 76. Each of the baffle plates 75 and 76 has an inverted L-shape and they are disposed such that the foot portion of the L extends horizontally above the fan blades 73 and the leg portion of the L is vertically disposed adjacent the rotating disk 72.

The fan and baffle assembly is an integral unit which is mounted to the frame 13 of the carriage 12 by means of four support bars 77 which are secured to the frame 13 by means of bolts 78. By simply unfastening the bolts 78 and disconnecting the hydraulic lines feeding the motor, the entire fan and baffle assembly may be removed by lowering it beneath the carriage.

The hydraulic motor 70 may be coupled directly to the power take off of the tractor that pulls the wagon, or it may be powered by any other conventional means.

With the arrangement thus described, we have been able to spread fertilizer over a forty foot path using an 18" disk for the fan rotating at 640 r.p.m. The vertical sides of the baffle plates 75 and 76 are approximately two inches from the fan, and they extend about two and a half feet on each side of the center of the shaft 71 which rotates the fan.

Figure 10:
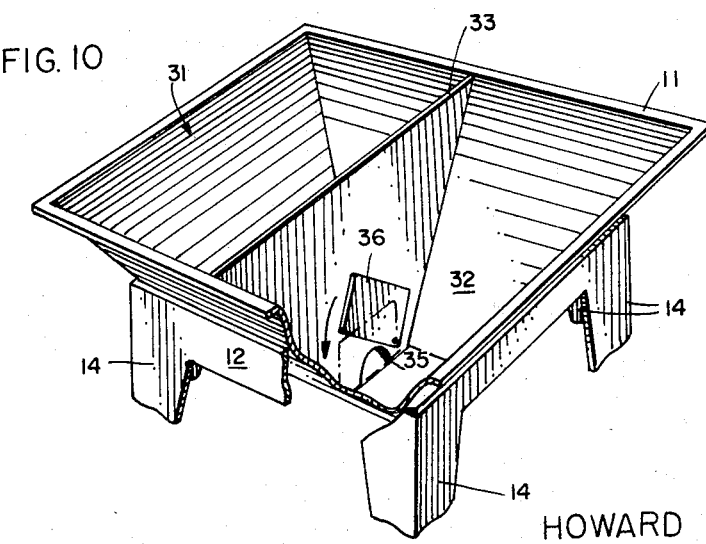
FIG. 10 is an upper perspective view of the hopper of FIG. 1.

In FIG. 10 is seen a perspective view of the gate 36 which closes the aperture 35 in the center divider 33 defining the two compartments 31 and 32, as previously described. When the gate 36 is rotated to its upper position (shown solid) it opens the aperture 35. It swings in a vertical plane whereas the separator 33 is inclined away from the plane in which the gate 36 swings. Hence, in its open position, there is no bearing surface between the gate 36 and the separator portion 33. As previously indicated, the reason for this is to eliminate bearing surfaces which may form crevices for collecting fertilizer and moisture which corrode the metal. The aperture 35 is advantageous when it is desired to spread only one material. Both discharge throats may be used (with different settings if desired) and the load will continue to be evenly distributed on the wagon.

It will be noted that the entire design of the metering and blending unit as well as the fan and baffle assembly has as a principal object the elimination of bearing surfaces over entended areas.

Although persons skilled in the art may easily modify the structure which has been described or substitute equivalent structure for that which has been shown without departing from the principle of the invention, it is intended that all such substitutions and modifications be covered.

We claim:

1. Apparatus for carrying and spreading at least a thousand pounds of granular material comprising a funnel-shaped hopper defining a mouth at its base; a four-wheeled carriage supporting said hopper; means coupling first and second forward wheels to said carriage including a hollow housing and a transverse axle received within said housing for pivotal motion in a vertical plane, said forward wheels being mounted on said axle for turning; a metering and blending unit attached to said hopper adjacent its mouth, said unit including a discharge throat communicating with each of said compartments of said hopper, valve means in each of said discharge throat for independently adjusting the rate of flow of material therethrough, first and second trap doors rotatably mounted adjacent said discharge throats, means remotely operative for selectively setting said trap doors to a first position sealing said discharge throats and for setting trap doors to a second position beneath their associated discharge throats for receiving material therefrom, a blender bar interposed between said trap doors in said open position, whereby said blender bar and said trap doors cooperate to define separate flow patterns for material flowing from each of said compartments; and a fan and baffle assembly mounted on said carriage and suspended beneath said metering and blending unit, said assembly comprising a hydraulically-powered rotary fan for receiving material in said distribution flow patterns, said flow patterns independently elongating symmetrically with respect to the axis of rotation of said fan for increased flow rates, and first and second baffle plates mounted transverse of the intended direction of travel of said spreader and extending laterally beyond said fan for receiving material propelled by said fan and for directing it laterally beneath said carriage.

2. Apparatus for carrying and spreading large quantities of granular material comprising: a funnel-shaped hopper defining a mouth at its base; carriage means supporting said hopper including ground-engaging support means for transporting said carriage in a first direction; means communicating with the mouth of said hopper for independently adjusting the rate of flow of material from said hopper; means beneath said hopper mouth receiving said material from said adjusting means for channeling said material under force of gravity in a downward flow pattern; power-assisted means rotatably mounted beneath said channeling means for receiving material in said flow pattern and for forcing it outward horizontally; and baffle means defining a passage transverse of the direction of travel of said carriage and beneath said hopper mouth receiving material propelled from said rotating forcing means for directing said material beneath and to the sides of said carriage.

3. The apparatus of claim 2 wherein said carriage includes a pair of front wheels and a pair of rear wheels supporting the same, and wherein said baffle means includes first and second plates located respectively in front of and behind said rotatable means and extending transverse of the direction of travel of said carriage for directing material from said rotatable means only sideways thereof beneath said hopper.

4. The apparatus of claim 3 wherein said rotatable means comprises a fan provided with radial blades rotatable about a vertical axis and a motor driving said fan, and wherein said baffle plates are spaced apart at a distance slightly greater than the diameter of said fan to prevent the material forced by said fan from carrying fore and aft of said transverse passage while beneath said carriage.

5. The apparatus of claim 3 wherein each of said baffle plates is provided with a foot plate integral with the top thereof and extending inwardly toward and over said rotating forcing means to further confine the material being spread to said transverse passageway beneath said hopper.

6. The apparatus of claim 2 further comprising mixer means mounted beneath said hopper mouth for receiving material falling therethrough and blending the same for evenly distributing said material onto said rotating means.

7. The apparatus of claim 2 wherein said carriage means includes a set of front wheels rotatably mounted on a front axle and located in front of said mouth of said hopper and a set of rear wheels rotatably mounted on a rear axle behind said mouth of said hopper, said baffle means extending sufficiently laterally of said hopper mouth to spread said material without directing the same against said carriage and wheels.

8. The apparatus of claim 7 wherein said carriage further comprises an elongated housing for receiving one of said axles, and means pivotally connecting the center of said received axle within said housing whereby said axle may rotate about a horizontal axis in the direction of travel of said carriage as said carriage wheels encounter ground elevations.

9. A spreader for transporting large quantities of granular material comprising a hopper including a lower discharge throat defining a mouth at its base; carriage means supporting said hopper including ground-engaging support means for transporting said carriage in a first direction; means communicating with said mouth of said hopper for adjusting the rate of flow of material from said hopper; blender means beneath said hopper mouth receiving said material falling therethrough and for blending the same; rotatable circular fan means mounted beneath said blender means for rotation about a vertical axis and receiving material from said blender means for forcing it outward horizontally, said blender means defining a material flow pattern onto said fan means symmetrical about the axis of rotation of said fan; trap door means rotatable about a horizontal axis between a first closed position for sealing said discharge throat and a second open position for channeling grain falling through said discharge throat into said blender means, said blender means cooperating with said trap door in said second position for defining a distribution flow pattern of said material onto said rotating fan means; first and second baffle plates, located respectively before and behind said fan means and defining a passage for material forced by said fan means transverse of the direction of travel of said carriage and beneath said carriage in a passage having a width only slightly larger than the diameter of said fan means; and motor means for powering said fan means independent of the ground speed of said carriage.

References Cited

UNITED STATES PATENTS

| | | | |
|---|---|---|---|
| 2,661,955 | 12/1953 | Sherer | 239—656 |
| 2,947,544 | 8/1960 | Hurt | 239—656 |

FOREIGN PATENTS 6,336  2/1893  Switzerland.

EVERETT W. KIRBY, *Primary Examiner.*

U.S. Cl. X.R.

239—666, 684, 687